United States Patent [19]

Abbott

[11] 4,279,050
[45] Jul. 21, 1981

[54] LEG LATCH FOR IN-PIT DOCK LEVELERS

[75] Inventor: Ronald E. Abbott, Marion, Ohio

[73] Assignee: Overhead Door Corporation, Dallas, Tex.

[21] Appl. No.: 99,112

[22] Filed: Nov. 29, 1979

[51] Int. Cl.³ ............................................. E01D 1/00
[52] U.S. Cl. ................................................. 14/71.3
[58] Field of Search ...................... 14/71.3, 71.1, 71.7

[56] References Cited

U.S. PATENT DOCUMENTS

| | | | |
|---|---|---|---|
| 3,137,017 | 6/1964 | Pfleger | 14/71.3 |
| 3,203,002 | 8/1965 | McGuire | 14/71.3 |
| 3,858,264 | 1/1975 | Kuhns | 14/71.3 |
| 3,877,102 | 4/1975 | Artzberger | 14/71.3 |
| 3,902,213 | 9/1975 | Pfleger | 14/71.3 |
| 3,921,241 | 11/1975 | Smith | 14/71.3 |
| 3,995,342 | 12/1976 | Wiener | 14/71.3 |
| 4,068,338 | 1/1978 | Artzberger | 14/71.3 |

Primary Examiner—Nile C. Byers, Jr.
Attorney, Agent, or Firm—Blanchard, Flynn, Thiel, Boutell & Tanis

[57] ABSTRACT

A dockboard having movable cross-traffic legs associated therewith, and a latch mechanism which automatically engages and holds the cross-traffic legs in a retracted position when the dockboard is being actively utilized for loading or unloading a truck. The latch mechanism is automatically unlatched following removal of the truck bed from beneath the ramp so that the legs are returned to their active position for supporting the ramp flush with the dock.

11 Claims, 4 Drawing Figures

LEG LATCH FOR IN-PIT DOCK LEVELERS

FIELD OF THE INVENTION

This invention relates to a dock leveler having cross-traffic legs hingedly suspended adjacent the front edge of the deck and, more specifically, to an improved dock leveler having a latch mechanism associated therewith for automatically latching the cross-traffic legs in a rearward position as a result of the deck being pivotally raised to a predetermined height, such as for the purpose of extending the lip plate.

BACKGROUND OF THE INVENTION

Dock levelers or dockboards, as they are also called, are adapted for installation adjacent loading docks to span the gap between the dock and the floor or bed of a truck. Dockboards of this type have a ramp or deck which is hingedly mounted at its rear edge, the front edge of the ramp having an extension plate hinged thereto for engagement with the bed of the truck. The entire dockboard is normally positioned within a shallow pit near the loading edge of the dock so that the rear hinged edge of the ramp is flush with the top of the dock, the ramp normally being maintained in this flush position when not in use. However, when in use, the ramp may be angularly inclined upwardly or downwardly to accommodate different bed heights and vertical movement of the bed during loading or unloading.

The structure and operation of such dockboards are well known, and several typical such dockboards are disclosed in U.S. Pat. Nos. 3,835,497; 3,882,563; 3,921,241 and 4,126,909, all owned by the assignee of this application.

To use the dockboard, the truck to be unloaded or loaded is backed into position adjacent the front of the dockboard, the rear edge of the bed being adjacent but slightly spaced from the dock by bumper pads. The hold-down device of the dockboard is then released so that the front edge of the ramp is raised upwardly, as by springs. This upward swinging of the ramp also causes the extension lip after it has cleared the rear end of the truck bed, to be raised. The operator then walks out onto the ramp to lower it, thereby causing the extension lip to move downwardly into engagement with the truck bed. The ramp, with its extension lip, thus bridges the gap between the dock and the truck bed, even though the truck bed may be above or below the dock level. A hold-down device normally prevents the ramp from lifting off the truck bed, although this device is designed so that the front edge of the ramp can float up and down with the changing height of the bed as the loading or unloading proceeds.

To support the ramp in a generally horizontal or cross-traffic position wherein the ramp is flush with the dock, such as when the dockboard is not in use with a truck, it has been conventional to provide a cross-traffic support associated with the ramp. This support typically comprises cross-traffic legs hingedly suspended from the ramp adjacent the forward edge thereof, which legs are disposed for engagement with fixed stops provided on the dockboard frame. Various forms and variations of such cross-traffic legs have been utilized, as disclosed in U.S. Pat. Nos. 3,921,241; 3,902,213; 3,877,102; 3,858,264 and 3,137,017. While many of these known arrangements have operated in a satisfactory manner under selected operational conditions, nevertheless most of the known cross-traffic leg arrangements have possessed recognized operational disadvantages, and/or have been undesirably complex both structurally and functionally.

The present invention thus relates to an improved cross-traffic support structure for a dockboard which is believed to overcome some of the disadvantages associated with the known structures, particularly under selected operating conditions, with the improved cross-traffic support structure of this invention possessing advantageous and improved structural and operational features.

More specifically, the present invention relates to a dockboard having movable cross-traffic legs associated therewith, and a latch mechanism which automatically engages and holds the cross-traffic legs in a retracted or inactive position when the dockboard is being actively utilized for loading or unloading a truck, which latch mechanism is automatically unlatched following removal of the truck bed from beneath the ramp so that the legs are automatically returned to their active position for supporting the ramp flush with the dock.

In the dockboard of the present invention, once the legs are latched rearwardly, they will remain latched while the dockboard is being used, whereby the legs do not interfere with the ability of the ramp to pivotally float up and down with the truck bed as loads are removed therefrom. This is particularly desirable since, during the unloading of a truck, as by means of a fork lift, the removal of the load coupled with the repetitive movement of the fork lift onto and off the truck bed causes the bed to float up and down several inches. If the cross-traffic legs are positioned for engagement with the stops during this unloading operation, the cross-traffic legs can prevent the desired lowering of the ramp when the bed is lowered, whereby the lip plate pivots downwardly so as to remain in engagement with the truck bed. This results in the lip plate creating a rather steep grade which makes it difficult for the loaded fork lift to exit from the truck. The latch mechanism of the present invention prevents the cross-traffic legs from engaging the stops during this type of operation, thereby insuring that the ramp will properly vertically float in response to weight-induced elevational changes of the truck bed.

According to the present invention, there is provided a dockboard having a hinged ramp positioned for engagement with the bed of a truck, which ramp is freely swingable through a selected angle which extends both above and below a horizontal position to thereby accommodate various bed heights. Cross-traffic legs are swingably mounted between the ramp and abutments so as to maintain the ramp at dock level for cross-traffic purposes, such as when the dockboard is not being utilized for loading or unloading a truck. The ramp has a lip pivotally supported at the front edge thereof, which lip is maintained in a downwardly suspended or pendent inactive position, the lip being actuated by a conventional mechanism when the ramp is elevated so as to lift the lip into a position wherein it is substantially flush with the ramp. A latch mechanism is provided for latching the cross-traffic legs in a rearward inactive position, this latch mechanism being automatically activated for latching the legs in response to upward lifting of the ramp during extension or raising of the lip. When so latched, the cross-traffic legs are no longer engageable with their abutments during normal utilization of the ramp. However, when the ramp reaches its lowermost position, the latch mechanism is automatically released so as to unlatch the cross-traffic legs so that they may resume engagement with the abutments when the ramp is returned to a position wherein it is level or flush with the dock. A manually-actuated retracting mechanism is also connected to the legs to enable them to be drawn rearwardly into their inactive position, without resulting in latching of the legs or requiring raising of the ramp, so that the ramp can be dropped downwardly below its dock-level position while maintaining the lip in its pendent position.

Other objects and purposes of the invention will be apparent to persons familiar with dockboards upon reading the following specification and inspecting the accompanying drawings.

Figure 1:
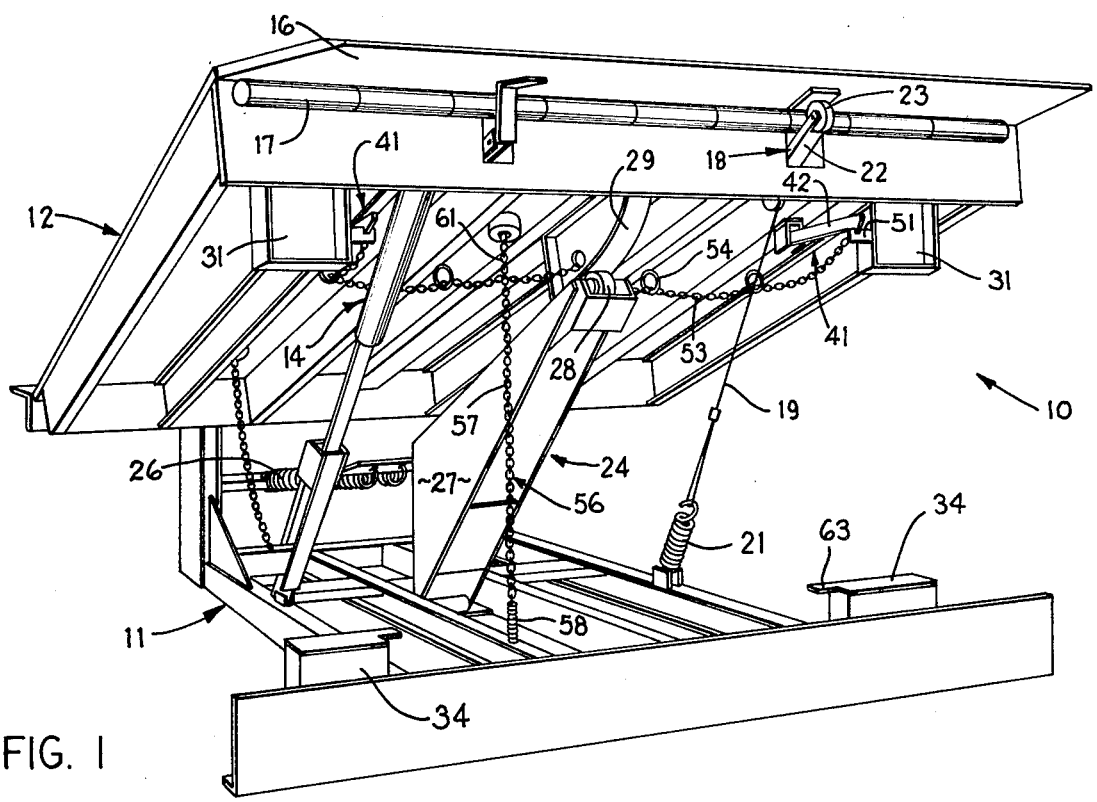
FIG. 1 is a perspective view of a dockboard in its raised position, and showing the latch mechanism as associated with the cross-traffic legs.

Certain terminology will be used in the following description for convenience in reference only and will not be limiting. For example, the words "upwardly," "downwardly," "right" and "left" will refer to directions in the drawings to which reference is made. The words "front" and "rear" will refer to the opposite edges of the dock leveler and the parts thereof, being respectively the left and right edges as appearing in FIGS. 2–4. The words "inner" and "outer" will refer to directions toward and away from, respectively, the geometric center of the dockboard and designated parts thereof. Such terminology will include the words above specifically mentioned, derivatives thereof, and words of similar import.

DETAILED DESCRIPTION

FIG. 1 illustrates an in-pit type dock leveler 10 consisting of a rigid base frame 11 and a ramp or deck 12 which, adjacent its rearward edge, is pivotally mounted on the base 11 by horizontal hinge pins 13. When in the cross-traffic or inactive position, the ramp 12 is normally maintained in a substantially horizontal position wherein it is substantially flush with the surrounding surface of the loading dock, this horizontal position being substantially as illustrated in FIG. 3.

When the dock leveler is of the mechanical type, as illustrated, the ramp 12 is maintained in its cross-traffic position by means of a conventional releasable hold-down device 14.

Figure 3:
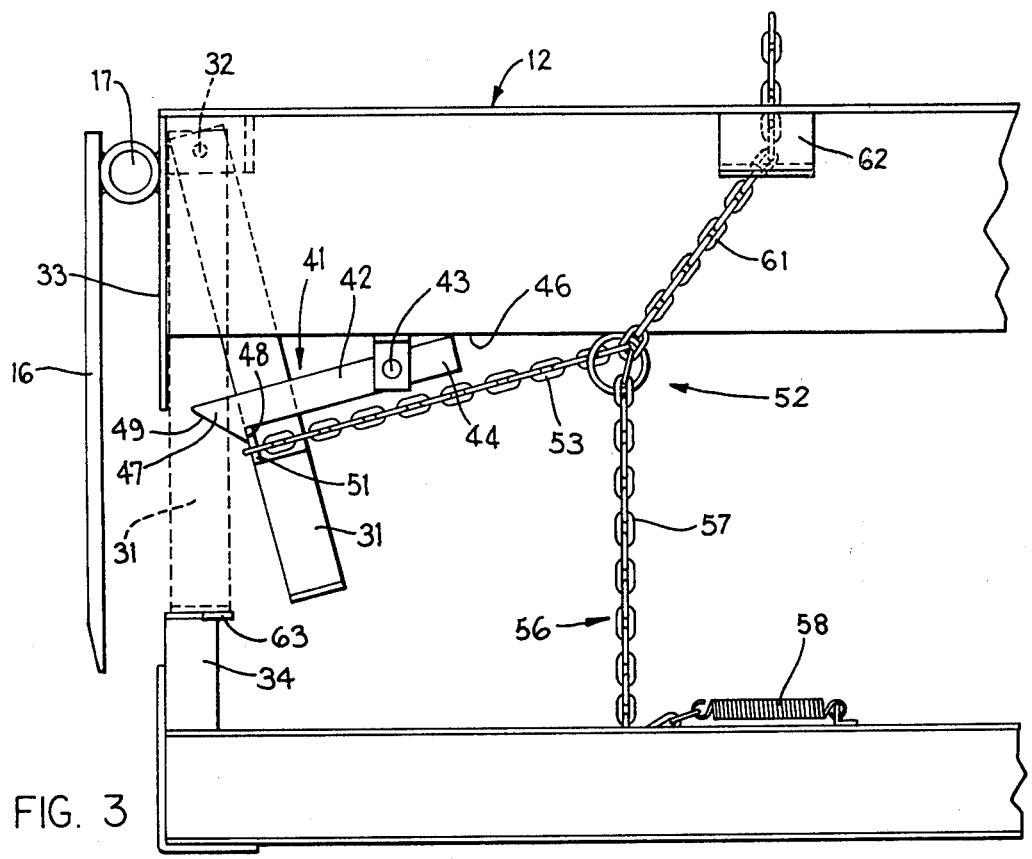
FIG. 3 is an enlarged, fragmentary cross-sectional elevational view of the dockboard in its horizontal cross-traffic position, as indicated by the dotted-line showing of the cross-traffic legs, and showing also the cross-traffic legs latched in their rearward position.

The dock leveler, in the conventional fashion, is provided with a lip plate 16 hinged at 17 to the forward edge of the ramp 12, which lip plate normally hangs downwardly in a pendent gravity position, substantially as illustrated in FIG. 3. The lip plate 16 is actuated to swing outwardly into an extended position when the deck swings upwardly and approaches its uppermost position, substantially as illustrated in FIG. 1. The upward swinging movement of lip plate 16 is caused by a conventional lip extension mechanism 18 which includes a cable 19 anchored at its lower end to the frame through a spring 21, which cable at its other end is connected to a pulley associated with the inner end of the slide bar 22, this latter bar having a roller 23 at its forward end which engages the underside of the lip plate to pivot same upwardly when the ramp is raised upwardly to a predetermined height.

The illustrated dock leveler, being of the mechanical type, has a spring-urged lifting arm mechanism 24 coacting between the frame and the ramp for normally urging the ramp to swing upwardly. This lifting arm mechanism is also of conventional construction, and includes springs 26 which are anchored at their rearward ends to the frame, and are connected at their forward ends to a lift arm 27 which is hinged to the frame and has a cam roller 28 at its free end disposed for rolling engagement with a ramp-type cam 29 fixed to the underside of ramp 12.

Ramp 12 also has a pair of cross-traffic support legs 31 mounted thereon, which legs have the upper ends thereof hinged at 32 to the ramp 12 adjacent the free edge thereof. These legs are disposed directly behind a front plate 33 which is rigidly secured to the front edge of the ramp. The cross-traffic legs are freely suspended from the ramp and are adapted to be positioned in supporting engagement with stationary abutments or stops 34 as fixed to the base 11. The cross-traffic legs 31 are normally supportingly engaged on the stops 34 when the ramp is maintained in its cross-traffic position, this relationship being illustrated by dotted lines in FIG. 3. The stops 34 are of such configuration as to allow the legs 31 to fit behind them when the legs are held or pulled rearwardly about their pivots 32.

The structure of the dock leveler, as briefly described above, is substantially conventional and further description of same is not believed necessary. Reference is made to U.S. Pat. Nos. 3,235,896; 3,835,497; 3,882,563 and 3,921,241, wherein much of the above-mentioned structure is described in greater detail.

According to the present invention, the dock leveler has a latch mechanism 41 associated therewith for maintaining the cross-traffic legs 31 in a rearward or inactive position so as to allow free pivoting movement of the ramp 12 both above and below the horizontal when it is being used in association with a truck bed for loading or unloading purposes.

The latch mechanism includes a latch bar 42 mounted on the underside of ramp 12 adjacent the forward edge thereof. This latch bar 42 is formed as an elongated lever which is hinged at 43 to the underside of the ramp. This hinge 43 is disposed between the ends of the latch bar, but is disposed more closely adjacent the rearward end, whereby the rearwardly projecting portion 44 of the latch bar is adapted to act as a stop inasmuch as it will bear against the undersurface 46 of the ramp so as to thereby limit the counterclockwise downward swinging of the latch bar, as caused by its own weight.

The forward end of latch bar 42 has a latching portion 47 provided on the forward end thereof, which portion defines a rearwardly directed latching surface 48. This latching portion 47 also has an outwardly and upwardly inclined cam surface 49 formed thereon, for a purpose to be explained hereinafter.

The cross-traffic leg 31 has a latch plate 51 fixed thereto and projecting sidewardly thereof, which plate 51 is adapted for latching engagement with the latch bar 42, as illustrated in FIG. 3, when the cross-traffic leg is to be maintained in its rearward position.

Figure 2:
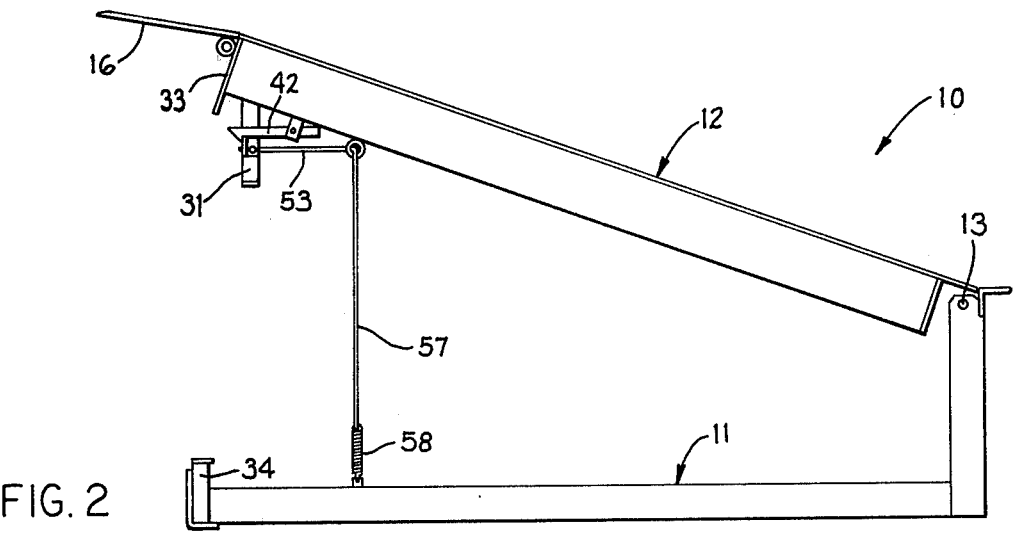
FIG. 2 is a side elevational view showing the ramp in its raised position for causing extension of the lip plate, and showing also the engagement of the latch mechanism with the cross-traffic legs.

To actuate the latch mechanism 41, there is provided an actuating mechanism 52 which results in automatic engagement of the latch bars 42 with the cross-traffic legs 31 whenever the ramp is raised upwardly into its uppermost position, substantially as illustrated by FIG. 2. This actuating mechanism 52 includes an elongated but substantially nonextensible flexible element 53, a link chain in the illustrated embodiment, which extends between the pair of cross-traffic legs 31 and has the opposite ends thereof connected to the latch plates 51. The chain is suitably guided by a series of loops 54 which are fixed to the underside of the ramp, with the chain also passing through a guide opening associated with the ramp cam 29. A further elongated resiliently-extensible activating element 56 is connected between the chain 53 and the base 11. This element 56, in the illustrated embodiment, includes two portions, the first being an elongated nonextensible element formed as a chain 57, and the second being a conventional tension spring 58. The upper end of chain 57 is fixed to the leg-connecting chain 53 at a location intermediate the ends thereof, and the lower end of chain 57 is connected to one end of spring 58, which spring at its other end if anchored to the base 11. The activating element 56 is of suitable lengthwise dimension as to impose a pulling force on the leg-connecting chain 53, to thereby swingably rearwardly move the legs 31, only when the ramp 12 is swung upwardly into the uppermost position illustrated by FIGS. 1 and 2.

The dock leveler is also provided with means for permitting manual rearward swinging of the legs 31. For this purpose there is provided a further elongated flexible element formed as an additional chain 61 which has the lower end thereof fixedly connected to the leg-connecting chain 53, this connection being in the same vicinity as the connection with the chain 57 for purposes of convenience. The chain extends upwardly from beneath the ramp and passes through a suitable chain-cup 62, with the upper free end of the chain being provided with a suitable loop or other hand-grip associated therewith so that the chain may be manually grasped and pulled upwardly by an operator standing on top of the ramp.

Figure 4:
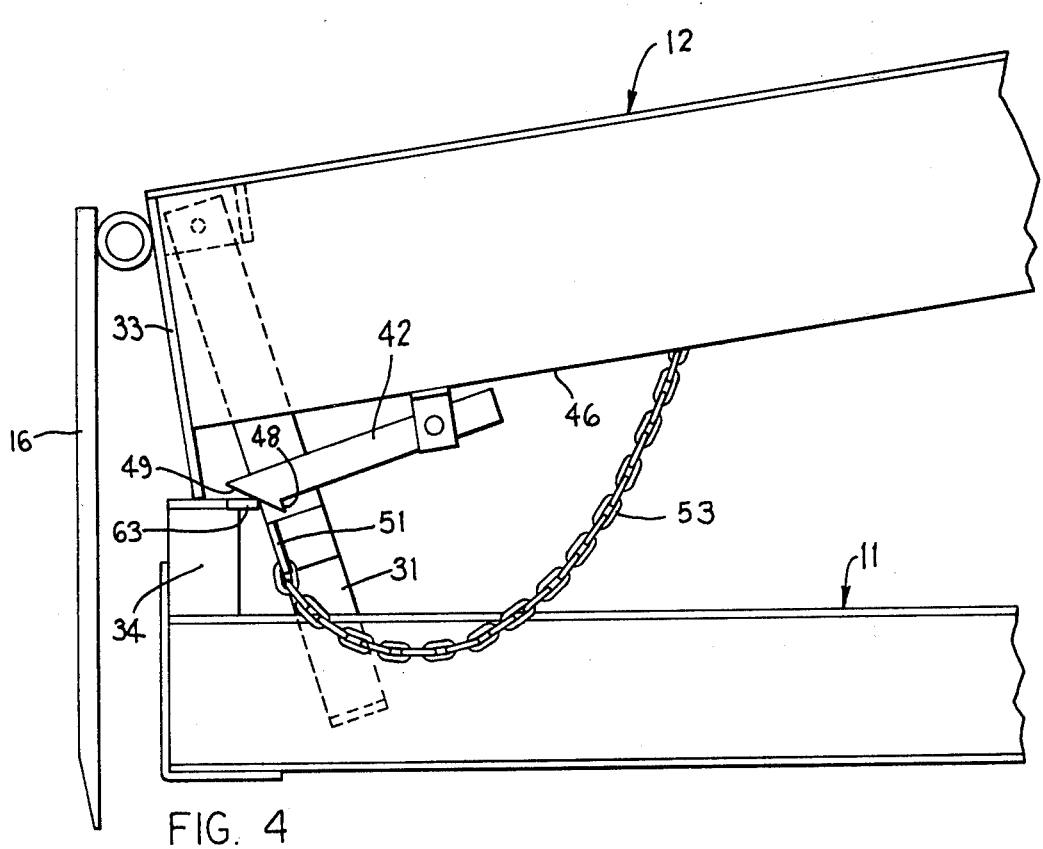
FIG. 4 is a view similar to FIG. 3 but illustrating the release of the latch mechanism wherein the ramp is swung downwardly into its lowermost position.

To release the latch mechanism 41 from the latched position illustrated by FIG. 3, the base 11 is provided with stationary cams 63 which, as illustrated, are fixed to the stops 34 and are formed as sideward protrusions disposed directly adjacent the upper end of the stops 34. These cams 63 are positioned so as to be engaged by the cam surfaces 46 provided at the free ends of the latch bars, thereby causing upward camming of the latch bars into a released position, substantially as illustrated in FIG. 4, when the ramp 12 is swung downwardly into its lowermost position, in which position the lower edge of front plate 33 bears on stops 34.

OPERATION

The operation of the dock leveler, and specifically the latch mechanism and its association with the cross-traffic legs, will be briefly described to insure a proper understanding thereof.

When the dock leveler is in its normal inactive or cross-traffic position, the ramp 12 is substantially horizontal and the legs 31 are suspended downwardly so as to bear on the stops 34, substantially as indicated by dotted lines in FIG. 3. The ramp is maintained in this horizontal position by the hold-down mechanism 14, and any load imposed on the ramp, such as due to a fork lift being driven thereacross, is supported by the engagement of the legs 31 on the stops 34.

When the leveler is in this cross-traffic position, the latch mechanism is maintained in a released condition, whereupon the latch bars 42 are positioned substantially as illustrated in FIG. 3, being held in this position due to engagement of the rear stop portion 44 against the undersurface 46. In this released position, the activating element 56 hangs in a slack condition so that the spring 58 is not tensioned.

When it is desired to utilize the dock leveler, the hold-down device 14 is manually released by an operator, whereupon the spring-urged lifting arm mechanism 24 causes the ramp 12 to swing upwardly into its uppermost position, substantially as illustrated by FIG. 2. During this raising of the ramp, the lip plate 16 is automatically hinged upwardly into its extended position by means of the lip extension mechanism 18, the operation of which mechanism is well known.

As the ramp is raised toward and closely approaches its uppermost position, the slack is removed from the activating element 56 and a tension force is then imposed on the spring 58 causing limited extension thereof. The force which is thus developed in the activating element 56 in turn pulls the leg-connecting chain 53 rearwardly, which in turn causes the cross-traffic legs 31 to be automatically hinged rearwardly as the ramp approaches its uppermost raised position. This rearward swinging of the legs 31 causes the latch plates 51 to initially engage the front beveled edge 49 of the latch bars, thereby causing a slight clockwise swinging of the latch bars until the latch plates pass beneath the beveled surfaces 48 and are disposed rearwardly of the latching surfaces 48, whereupon the weight of the latch bars causes them to swing downwardly in a counterclockwise direction, thereby retaining the latch plates 51 behind the latch surfaces 48 so that the cross-traffic legs 31 are thus fixedly and positively held in their rearward or retracted positions. FIG. 2 illustrates the legs in their latched rearward positions, and additionally indicates the lip plate in its extended position. The ramp 12 is thus suitably activated and hence can now be swung downwardly so as to engage the lip plate 16 with the truck bed. This latter downward swinging of the ramp is effected in a conventional manner, such as by the operator slowly walking outwardly along the ramp to cause downward swinging thereof.

With the legs latched in their rearward positions, as above described, the ramp 12 can thus undergo any desired swinging movement, either above or below the horizontal position, as caused by the changing load on the truck or as caused by the movement of a fork lift or other vehicle back and forth between the dock and the truck. The legs 31 will be continuously retracted so as to thus be positioned with the lower ends thereof spaced rearwardly of the stops 34, and hence the legs are prevented from interfering with the desired swinging movement of the ramp.

When the loading or unloading of the truck has been completed and the truck moves away from the dock leveler, the removal of the truck bed from beneath the lip plate 16 permits the ramp to swing freely downwardly under the urging of gravity, which downward swinging will be limited by the engagement of the lower edge of front plate 33 with the stops 34 as indicated in FIG. 4. In this lower limit position, the ramp is sloped slightly downwardly so that the free edge thereof is disposed below dock level. As the ramp approaches this lowermost limit position, the cam surfaces 49 on latch bars 44 engage the protrusions 63 fixed to the stops 34, thereby causing a slight upward clockwise swinging of the latch bars, and hence resulting in the latch bars releasing the latch plates 51. The legs 31 are thus swingably urged, by gravity, in a forward direction so as to bear against the rear of the stops. The ramp is then permitted to swing upwardly into its horizontal position, such as due to the urging of the lifting arm mechanism, during which the legs 31 are permitted to freely swing so as to return into their vertical positions wherein they are disposed directly above and aligned with the stops 34. The ramp is thus maintained in this latter position by means of the hold-down device, whereupon the legs are properly positioned directly above and substantially in supporting engagement with the stops 34.

The latch mechanism 41 of this invention, and specifically the actuating mechanism 52 for the latch bars, is wholly independent of the lip plate 16 and its extending mechanism 18. Thus, the ramp 12 can be swung downwardly all the way towards its lowermost position while maintaining the cross-traffic legs 31 latched in their retracted positions, and this can be accomplished even when the lip plate 16 is in its pendent position.

While the invention has been illustrated and described in conjunction with a mechanically-actuated dock leveler, it will be appreciated that the improved latch mechanism of this invention, and its association with the cross-traffic legs, is equally applicable on fluid-powered dock levelers, specifically hydraulically-actuated dock levelers.

While the legs are preferably hingedly mounted on the ramp and disposed for coaction with stationary stops associated with the frame, such as is conventional with most dock levelers, it will be appreciated that this cooperation could be reversed in that the hinged legs could be provided on the frame and the stationary stops could be provided on the ramp.

If desired or required, the cross-traffic legs could also have springs associated therewith so as to normally urge them into their frontmost positions for alignment with the stops.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a dock leveler having a base structure, a ramp structure pivotally connected to said base structure for pivotal movement between raised and lowered positions, said ramp structure being pivotal about a substantially horizontal pivot axis adjacent the rear edge thereof, said ramp structure having the front edge adapted for engagement with the floor of a carrier disposed in a loading or unloading position adjacent a dock, and a cross-traffic support means cooperating between the base and ramp structures for supporting said ramp structure in a substantially horizontal position which is disposed intermediate said raised and lowered positions, said cross-traffic support means including a first support member fixed to one of said structures and a second support member hingedly mounted on the other of said structures, said second support member being movable relative to said other structure between supporting and nonsupporting positions, said second support member when in said supporting position being disposed for engagement with said first support member to thereby support said ramp structure in said horizontal position for permitting passage of cross-traffic thereover, and a latching mechanism for holding said second support member in said nonsupporting position wherein it cannot be engaged with said first support member, comprising the improvement wherein said latching mechanism includes:

a latch member movably supported on said other structure and disposed for latching engagement with said second support member when the latter is in said nonsupporting position; and activating means connected between said second support member and said one structure for causing said second support member to be automatically moved into said nonsupporting position, and latchingly engaged with said latch member when said ramp structure is swung upwardly into said raised position.

2. A dock leveler according to claim 1, wherein said second support member is normally urged toward, and maintained in, said supporting position, and wherein said activating means includes elongated force-transmitting link means having one end thereof anchored to said one structure and the other end thereof anchored to said second supporting member, said link means imposing a displacing force on said second latch member for moving same into said nonsupporting position solely when said ramp structure is positioned in close proximity to said raised position.

3. A dock leveler according to claim 2, wherein said elongated force-transmitting link means comprises an elongated, flexible, resiliently extensible means.

4. A dock leveler according to claim 1, including release means fixedly mounted on said one structure and disposed for engaging said latch member to release the latter from said second support member when said ramp structure is in said lowered position.

5. A dock leveler according to claim 1, wherein said ramp structure includes a lip plate horizontally hingedly supported thereon adjacent the forward edge thereof, said lip plate being swingably movable between pendent and extended positions, an extending mechanism coacting with said lip plate for automatically moving same into said extended position when said ramp structure is moved into said raised position, and said latching mechanism being operated wholly independent of said lip plate and said lip plate extending mechanism.

6. A dock leveler according to claim 1, wherein said first support member comprises a stationary stop which is fixedly secured to said base structure and is disposed below said ramp structure adjacent the forward edge thereof, said second support member comprising a leg which is hingedly connected to and suspended downwardly from said ramp structure adjacent the forward edge thereof, said leg being suspended substantially vertically downwardly when in said supporting position so that the leg is disposed approximately in vertical alignment with said stop, said latch member being pivotally supported on the underside of said ramp structure and rearwardly of said leg, said leg having a latching portion engageable with said latch member when the leg is swung rearwardly of said ramp into said nonsupporting position.

7. A dock leveler according to claim 6, wherein said latch member is supported on said ramp structure for pivoting movement about a substantially horizontal axis which is substantially parallel with said hinge axis, said latch member being normally urged in a first rotational direction into engagement with a stop associated with said ramp structure, said latch member having a cam portion associated therewith and engageable with said leg when the latter is swung rearwardly to effect limited swinging of said latch member in the opposite rotational direction sufficient to permit the latch portion on said leg to be disposed rearwardly of a latching surface formed on said latch member.

8. A dock leveler according to claim 6 or claim 7, wherein said activating means includes an elongated, flexible, resiliently extendible means having one end thereof anchored to said base structure and the other end thereof anchored to said leg, said last-mentioned means exerting a displacing force on said leg to cause swinging rearward displacement thereof toward said nonsupporting position solely when said ramp structure is disposed in close proximity to said raised position.

9. A dock leveler according to claim 8, wherein said ramp structure has a pair of said legs hingedly suspended therefrom adjacent the opposite ends of said front edge, said extendible means including a first elongated flexible element extending between and anchored to said pair of legs, and a second elongated flexible element having one end thereof anchored to said first flexible element at a location disposed intermediate the ends thereof, the other end of said second flexible element being anchored to said base structure, said second flexible element having resiliently extensible spring means associated therewith.

10. In a dock leveler having a base structure, a ramp structure hinged at its rear edge to the base structure and movable from a generally horizontal position to upwardly and downwardly inclined positions, a lip plate hingedly connected to said ramp structure adjacent the front edge thereof and swingably movable between pendent and extended positions, an extending mechanism connected to said lip plate for automatically moving same into said extended position in response to upward swinging of said ramp structure from said horizontal position into a raised position wherein the ramp is substantially upwardly inclined, support means coacting between said ramp and base structures for supporting the ramp structure in said generally horizontal position, said support means including a first support fixedly secured to one of said structures and a second support movably supported on the other of said structures and movable relative thereto between an operable ramp-supporting position and an inoperable nonsupporting position, and latch means for retaining said second support in said inoperable nonsupporting position, said second support being normally maintained in said operable position when said latch means is released, the improvement comprising activating means connected to said second support for automatically moving said second support toward said inoperable position for latching engagement with said latch means whenever said ramp structure is swingably moved into said raised position, said activating means being wholly independent of said lip plate and of said extending mechanism, and latch release means fixedly mounted on said one structure and disposed for operative coaction with said latch means to release said latch means from said second support solely when said ramp structure is swingably moved into a lowermost position wherein it is inclined downwardly.

11. A dock leveler according to claim 10, wherein said activating means is operatively connected between said one structure and said second support for effecting displacement of said second support toward said inoperable position solely when said ramp structure is disposed in close proximity to said raised position.

* * * * *